United States Patent [19]  [11] 4,046,857
Fekete et al. [45] Sept. 6, 1977

[54] CONTINUOUS PROCESS FOR THE PRODUCTION OF PHOSPHONITRILIC CHLORIDES

[75] Inventors: Thomas M. Fekete, Yardley, Pa.; John F. Start, Mercerville, N.J.

[73] Assignee: FMC Corporation, Philadelphia, Pa.

[21] Appl. No.: 578,631

[22] Filed: May 19, 1975

Related U.S. Application Data

[63] Continuation-in-part of Ser. No. 484,857, July 1, 1974, abandoned.

[51] Int. Cl.² .............................................. C01B 25/10
[52] U.S. Cl. .................................................. 423/300
[58] Field of Search ........................................ 423/300

[56] References Cited

U.S. PATENT DOCUMENTS

| 3,656,916 | 4/1972 | Scheidermaier | 423/300 |
| 3,780,162 | 12/1973 | Bergeron et al. | 423/300 |

*Primary Examiner*—O. R. Vertiz
*Assistant Examiner*—Gregory A. Heller

[57] ABSTRACT

Polymeric phosphonitrilic chlorides are produced from ammonia and phosphorus pentachloride in a continuous process in a plurality of reaction zones characterized by simultaneous addition of reactants and continuous withdrawal of product.

11 Claims, No Drawings

CONTINUOUS PROCESS FOR THE PRODUCTION OF PHOSPHONITRILIC CHLORIDES

This application is a continuation-in-part of copending application Ser. No. 484,857, filed July 1, 1974, now abandoned whose entire disclosure is incorporated herein by reference.

This invention relates to a process for the preparation of polymeric phosphonitrilic chlorides. More particularly, the invention relates to a novel, continuous process for the production of polymeric phosphonitrilic chlorides by the ammonia-phosphorus pentachloride reaction under constant process conditions.

Polymeric phosphonitrilic chlorides, particularly the lower molecular weight predominantly cyclic phosphonitrilic chloride oligomers of the general formula $(PNCl_2)n$, n being an integer of at least 3, are generally prepared by the reaction of either ammonia or ammonium chloride with phosphorus pentachloride. In some cases, these reactants may be formed in situ.

Representative prior art processes are described, for example, in U.S. Pat. No. 3,359,080, issued Dec. 19, 1967 to Ridgeway et al, wherein elemental chlorine, $PCl_3$ and $NH_4Cl$ are reacted in an inert solvent; U.S. Pat. No. 3,462,247, issued Aug. 19, 1969 to Paddock et al wherein a metallic salt is used to catalyze the $PCl_5$-$NH_4Cl$ reaction; U.S. Pat. No. 3,656,916 to Schiedermaier et al wherein $PCl_5$ and $NH_3$ are reacted in an inert solvent, the ammonia being added under controlled rates of addition; U.S. Pat. No. 3,658,487, issued Apr. 25, 1972 to Wunsch et al wherein chlorine, ammonia and phosphorus are reacted in an inert chlorinated hydrocarbon solvent; U.S. Pat. No. 3,669,633, issued June 13, 1972 to Beinfest et al wherein $PCl_3$ and $Cl_2$ are used to form $PCl_5$ in situ; and U.S. Pat. No. 3,780,162, issued Dec. 18, 1973 to Bergeron et al wherein ammonia and $PCl_5$ are reacted under pressure in the presence of hydrogen chloride, which serves as a reactant to produce ammonium chloride in situ. Wunsch et al further discuss the $PCl_5$-$NH_3$ reaction and the $P_3NCl_{12}$ intermediate formed therein in Chem.-Zeitung 94, (21) 832 1970.

The prior art techniques employing only gaseous ammonia and phosphorus pentachloride as reactants may generally be characterized as batchwise processes. They are dependent upon the addition of ammonia at certain rates, which must be varied over the course of the reaction, to a reactor which contains the complete quantity of phosphorus pentachloride to be converted to polymeric phosphonitrilic chloride product. It is generally recognized that for production on a commercial scale, a continuous process which features the use of constant reaction conditions is highly desirable. It is the objective of the present invention to provide a continuous process for the production of polymeric phosphonitrilic chlorides from phosphorus pentachloride and gaseous ammonia without the inherent limitations of batchwise reaction techniques.

In accordance with one preferred aspect of the present invention, there is provided a novel, continuous process for the production of polymeric phosphonitrilic chlorides, which contain a major amount of cyclic oligomers, in a plurality of reaction zones comprising substantially continuously and simultaneously feeding the reactants, ammonia and phosphorus pentachloride into a first reaction zone containing an inert diluent (for example, a solvent) for the reactants in sufficient quantity so as to provide a pumpable slurry of the reactants and products therefrom, and continuously transferring the reaction mixture to a subsequent reaction zone or zones maintained at reaction temperatures higher than the temperatures of the first reaction zone, and wherein additional ammonia may be introduced, the total amount of ammonia employed being between about 1.01 and 1.20 moles or more, up to about 2 to 3 moles per mole of $PCl_5$, at least 0.33 mole of ammonia per mole of $PCl_5$ being introduced into the first reaction zone and the balance of the ammonia being introduced into the remaining reaction zone or zones, and withdrawing product polymeric phosphonitrilic chloride from said subsequent reaction zone or zones.

One aspect of the invention relates to the conditions of operation of the first continuous reaction zone. One preferred feature is that the streams of $NH_3$ and $PCl_5$ are fed to that zone, which contains the inert liquid diluent, at such a rate that the concentration of $PCl_5$ in that zone is maintained at a low level, considerably below 10%, preferably below 2% by weight such as about 1% (it may, of course, be higher during start-up, before steady-state operation). Another preferred feature is that the first reaction zone, into which the streams of $NH_3$ and $PCl_5$ are fed, contains a circulating mixture of diluent, finely divided $NH_4Cl$ particles produced in situ from $NH_3$, and reaction product of $NH_3$ and $PCl_5$, and a stream of this circulating mixture is continuously withdrawn from that reaction zone. In the first reaction zone, the volume of the circulating reaction mixture in relation to the rates of feeding and withdrawal is preferably such that the $PCl_5$ concentration in the circulating reaction mixture is very low, preferably below 2% as mentioned above. The ratio of the volume (in liters) of the circulating reaction mixture to the feed rate of $PCl_5$ (in gram atoms of P per minute) is preferably at least 10; similarly the ratio of the volume of said circulating mixture to the rate at which said mixture is withdrawn is preferably at least 10 liters per gram atom of P withdrawn per minute. In preferred operation, the circulating reaction mixture in the first reaction zone (and thus the stream of such reaction mixture continuously withdrawn from that zone) contains solid finely divided $NH_4Cl$ particles formed in situ as well as solid particles of first stage intermediate product which may be generally characterized as a coupled $NH_3$-$PCl_5$ intermediate having a P:N atomic ratio greater than one, and having less than 5 phosphorus atoms directly linked to nitrogen, such as the intermediate having the formula $[Cl_3P=N-PCl_3]^+PCl_6^-$, trichlorophosphaso-trichlorophosphonium hexachlorophosphate, described by Wunsch et al in Chem.-Zeitung 94 (21) 832, 1970.

At least one of the subsequent reaction zone or zones are maintained under cyclization conditions in order to effect completion of the reaction by transformation of the $PCl_5$-$NH_3$ complex intermediate formed in the initial reaction zone to the desired cyclic oligomers of phosphonitrilic chloride.

The preferred cyclization conditions include a temperature of about 125° to 180° C and a dilution such that the concentration of cyclized product and intermediate $NH_3$-$PCl_5$ products expressed as gram-atoms of combined phosphorus per liter, is from about 1 to 5, preferably about 1 to 3, gram-atoms of combined phosphorus per liter, present in the form of cyclic $-(PNCl_2)_n$ polymeric products and intermediate products such as $[Cl_3P=N-PCl_3]^+PCl_6^-$. Additional ammonia may be introduced into one or more of these subsequent reaction zones. Only one additional reaction zone is required, since the cyclization may be completed in and a stream of product may be continuously withdrawn from such a second reaction zone. The cyclization may also be effected batchwise, as in a reactor supplied by reaction product which has been withdrawn continuously from the first reaction zone.

In contrast to the prior art processes, particularly the aforesaid U.S. Pat. No. 3,656,916, which also employs only phosphorus pentachloride and ammonia as reactants, the process of the present invention simultaneously and continuously feeds phosphorus pentachloride and gaseous ammonia into an initial reaction zone, and completes the reaction in one or more additional reaction zones where the remainder of the required amount of ammonia may be fed in. The rates of ammonia addition may remain unchanged as the reaction proceeds. Thus, precise control of ammonia feed rate and variation of these rates over the course of the reaction is not required and the desired objective of continuous processing under constant reaction conditions are achieved. It is within the scope of the present invention to add the reactants by alternatively feeding appropriate quantities of $PCl_5$ and $NH_3$ to the reaction mixture and this mode of addition is encompassed by the term continuously and simultaneously.

In the process of the present invention, phosphorus pentachloride is preferably added in solution in an inert organic solvent at a concentration of about 1 to 5 moles per liter of solvent. Preferably, a phosphorus pentachloride concentration of about 1 to 3 moles per liter of solvent is employed. Suitable inert organic solvents include the halogenated aromatic and aliphatic hydrocarbons having a boiling point from about 60° C to 225° C such as tetrachloroethane, chloroform, carbon tetrachloride, chlorobenzene, dichlorobenzene, trichlorobenzene and the like with the chlorinated aromatic hydrocarbon solvents boiling from 130° to 190° C being preferred. The reactors can be maintained under pressure, for example, when lower boiling solvents are used. The feed $PCl_5$ is preferably maintained in solution by keeping the solution at a temperature of about 80° C to 120° C. Slurries of $PCl_5$ in a suitable solvent may also be used. It is also feasible to add the $PCl_5$ in solid form into the initial reaction zone, as long as sufficient diluent is present to maintain a slurry of all components.

$PCl_5$ may be prepared immediately before its introduction into the reaction zone by reacting suitable quantities of $PCl_3$ and $Cl_2$. Generally, a slight molar excess of $Cl_2$ is used such that the molar ratio of $Cl_2$ to $PCl_3$ is about 1.0-1.10:1, preferably about 1.05 mole of $Cl_2$ per mole of $PCl_3$. Thus, a stream of $PCl_3$ in the solvent and a stream of $Cl_2$ may be fed into a tubular reactor and $PCl_5$ formed therefrom and then used directly in the process of the present invention. The reaction between $PCl_3$ and $Cl_2$ is very rapid (for example, at a reaction temperature of about 100° C) and exothermic; thus the residence time in such tubular reactor may be very short; the resulting hot solution of $PCl_5$ may be fed directly into the first reactor.

In carrying out the process of the present invention, employing the preferred embodiment, gaseous ammonia and a solution or slurry of phosphorus pentachloride in a suitable inert organic solvent such as monochlorobenzene or dichlorobenzene, are simultaneously fed into a first reaction zone which is maintained at a temperature of about 100° to 120° C, preferably between 115° and 120° C, not exceeding the boiling point of the solvent. While gaseous ammonia is preferred, ammonia in liquid form is, of course, suitable. Reactants are introduced at a rate so that there is concurrently fed into the first reaction zone at least 0.33 mole of ammonia per mole of phosphorus pentachloride introduced into the first reaction zone. The total quantity of $PCl_5$ is metered into the first reactor. The entire amount of ammonia which is continuously introduced, that is, between about 1.01 and 1.20, and preferably 1.05 to 1.15, moles of ammonia per mole of phosphorus pentachloride may all be metered into the first reaction zone, but it is suitable to apportion the quantity of ammonia between the first and later reaction zones, as long as the minimum quantity of 0.33 mole per mole of $PCl_5$ is fed into the first reactor.

Under preferred operating conditions, at least 0.50 mole or more (for example, 0.6 or 0.8 mole), most preferably the entire amount, 1.05 to 1.15 moles ammonia per mole of phosphorus pentachloride is fed into the first reaction zone and any balance, that is, an additional 0.60 or less, mole of ammonia per mole of phosphorus pentachloride that has been added to the first reaction zone, is thereafter introduced into the second reaction zone, which is operated at a temperature of about 125° to 180° C, preferably about 135° to 145° C.

The average residence time in the first reactor may be relatively short such as about 30, 90 or 120 minutes and up to about 3 hours or more. In the second reaction zone, the average residence time may be more extended, depending on the residence time in the first stage; for example, it may be on the order of about 2 to 6 hours in order to insure completion of the reaction. It is often desirable to have a total residence time between about 4 to 8 hours for the overall two-stage reaction. It is believed that the reaction proceeds first by formation in the first reaction zone of a complex intermediate which undergoes further reaction both in the first and the second reaction zones to form the desired predominantly cyclic, polymeric phosphonitrilic chloride oligomers. The reaction mixtures in the first and second reaction zones are preferably continuously stirred during the operation of the process. In the second reaction zone, $NH_4Cl$ particles formed in the first reaction can undergo further reaction with compounds containing phosphorus and chlorine (for example, $PCl_5$ and intermediates) to form the desired cyclic phosphonitrilic chloride oligomers.

In the process of the present invention, phosphorus pentachloride reacts very rapidly in the first reaction zone, thereby minimizing the phosphorus pentachloride steady state concentration in the first zone, as previously mentioned. Thus, losses of phosphorus pentachloride due to thermal decomposition, a problem in batchwise processes, are substantially eliminated in the process of the present invention.

Any convenient system of stirred reactors may be employed, with an overflow system of reactors being preferable, since the reaction mixture can be allowed to simply flow from the first reaction zone to the second. By-product hydrogen chloride gas may be removed overhead from the reactors as formed (for example, at atmospheric pressure) and can be collected using conventional aqueous caustic scrubbers. Instead of an overflow reactor system, suitable pumping apparatus may be used to transport the pumpable slurry product from the first reactor to the second. The process may be conveniently carried out under atmospheric pressure, but superatmospheric or subatmospheric pressures may also be used.

The product of the reaction is an oligomeric phosphonitrilic chloride polymer containing a desirable high proportion of cyclic oligomers, at least 50% by weight or more, the balance being linear materials. Preferably, about 75 to 95% by weight of lower molecular weight cyclic phosphonitrilic chlorides are formed which include trimers, tetramers, pentamers, hexamers, and heptamers, and, of these cyclic oligomers, about 50 to 60% by weight are trimeric, 20 to 30% by weight are tetrameric and the balance are pentameric, hexameric and heptameric oligomers.

The novel continuous process of the present invention has a number of distinct advantages. Since it is a continuous method, no variation in reaction conditions, in particular the ammonia feed rate, is required during commercial operation, which allows for greatly increased productivity over heretofore employed conventional batchwise reaction techniques. The products are produced in high yields and characterized as being consistently uniform with respect to cyclic/linear ratios and molecular weight distribution of the product phosphonitrilic chloride oligomers.

The invention is further illustrated by the following examples which are not to be considered as limitative of its scope. Percentages are by weight, except where otherwise indicated.

EXAMPLE I

In the continuous process, there are used two stirred reactors containing reaction mixtures maintained at such overflow levels that the hold time in each is about 3 hours (hold time is the time needed to fill the reactor to said level at the constant rate of feed used in the process). The $PCl_5$ is fed, at a constant rate, as a hot (115° C) solution in o-dichlorobenzene solvent (DCB) containing about 1.25 moles of $PCl_5$ per liter, into the bottom of the first reactor. A stream of gaseous ammonia is fed into the lower part of the first reactor just above the path of the tip of the stirrer blade, at a constant rate such as to provide about 1.05 to 1.10 mole $NH_3$ per mole of $PCl_5$ fed into the first reactor. The reactor temperature is kept in the range of 115° to 119° C; pressure is substantially atmospheric. After the initial filling period, the level of reaction mixture in the first reactor is maintained by pumping a slurry of excess reaction mixture comprising $PCl_5$-$NH_3$ intermediate, $NH_4Cl$ and any unreacted $PCl_5$ to the second reactor kept in the range of 135° to 140° C. No ammonia is introduced into the second reactor. The level in the second reactor (after its initial filling period, for example, after three hours of continuous transfer) is also maintained by pumping excess mixture to a product collector. By-product HCl gas from both reactors is collected in aqueous caustic scrubbers. The crude product is checked periodically for insolubles which are almost exclusively $NH_4Cl$, for product polymeric phosphonitrilic chloride content, and for the percent of linear fraction (hexane insolubles) in the product.

A sample of product was filtered and then stripped of DCB in vacuo to obtain a product that contained 89.2% hexane soluble cyclic oligomers. The linear (hexane-insoluble) fraction was a yellow oil. The cyclic portion was analyzed by gas chromatography. Molecular distribution of the cyclic portion was as follows:
Trimer; 55.2%
Tetramer; 26.3%
Pentamer; 12.6%
Hexamer; 3.3%
Heptamer; 2.6%

EXAMPLE II

A two-stage cascaded continuous reaction is effected as set forth in Example I, with the exception that $NH_3$ feed is divided equally between the two reactors, instead of the total $NH_3$ being fed to the first reactor. Into each reactor is metered a five to ten percent excess over the one-half molar equivalent of $NH_3$, based on the moles of $PCl_5$ introduced. A sample of product obtained under conditions as described in Example I, was collected and filtered. The filtrate was stripped of solvent in vacuo to obtain the product polymeric phosphonitrilic chloride, which contained 87.1% hexane soluble cyclic oligomers. The hexane insoluble linear fraction was a yellow oil. The cyclic portion was analyzed by gas chromatography and the distribution of cyclic portion was as follows:
Trimer; 56.8%
Tetramer; 25.3%
Pentamer; 12.1%
Hexamer; 3.5%
Heptamer; 2.3%

EXAMPLE III

Example I is repeated except that the hold time in the first reactor is 1½ hours. The product contained 88% cyclic oligomers having a distribution of cyclic $C_3$-$C_7$ oligomers substantially as reported in Example I.

What is claimed is:

1. A continuous process for the production of polymeric phosphonitrilic chlorides which comprises:
    a. continuously feeding phosphorus pentachloride in an inert solvent into the first of two reaction zones;
    b. concomitantly feeding ammonia continuously into at least the first of the two reaction zones;
    c. maintaining the phosphorus pentachloride and ammonia reactants in the first reaction zone at a temperature of 100° to 120° C;
    d. continuously transferring the reaction mixture from the first reaction zone to the second reaction zone maintained at a temperature of 125° to 180° C;
    e. feeding the ammonia to the first reaction zone at a ratio of at least 0.33 moles per mole of phosphorus pentachloride with the total ammonia introduced in the process being between 1.01 and 1.20 moles of ammonia per mole of phosphorus pentachloride; and
    f. continuously withdrawing phosphonitrilic chloride polymer from the second reaction zone.

2. The process of claim 1 where the first reaction zone is maintained at a temperature of from about 115° to 120° c.

3. The process of claim 1 where the second reaction zone is maintained at a temperature of from about 135° to 145° C.

4. The process of claim 1 where the solvent is a chlorinated aromatic hydrocarbon.

5. The process of claim 1 where the total amount of ammonia introduced is from about 1.05 to 1.15 moles per mole of phosphorus pentachloride.

6. The process of claim 1 where the total amount of ammonia is introduced into the first reaction zone.

7. The process of claim 1 where the phosphorus pentachloride is employed as a resolution having a concentration of 1 to 3 moles of $PCl_5$ per liter of solvent.

8. The process of claim 1 where said product phosphonitrilic chloride polymer contains at least 50% by weight of cyclic oligomers.

9. The process of claim 1 where the average residence time in the first reaction zone is at least about 90 minutes.

10. The process of claim 1 where the ammonia is introduced in gaseous form.

11. A continuous process for the production of polymeric phosphonitrilic chlorides which comprises:
  a. continuously feeding phosphorus pentachloride in an inert solvent into the first of a plurality of reaction zones, at a feed rate such that the steady state concentration of phosphorus pentachloride in the first reaction zone is maintained below about 2% by weight;
  b. concomitantly feeding ammonia continuously into at least the first of the plurality of reaction zones, at a feed rate such that the ammonia is introduced into the first reaction zone at a ratio of at least 0.33 mole per mole of phosphorus pentachloride and the total ammonia introduced in the process is between 1.01 and 1.20 moles of ammonia per mole of phosphorus pentachloride;
  c. maintaining the phosphorus pentachloride and ammonia reactants in the first reaction zone at a temperature of between 100° C to 120° C;
  d. continuously transferring the reaction mixture sequentially from each reaction zone to the next reaction zone;
  e. maintaining the temperature of at least one reaction zone subsequent to the first reaction zone at a temperature of between 125° C to 180° C; and
  f. continuously withdrawing phosphonitrilic chloride polymer from at least the final reaction zone of the plurality of reaction zones.

* * * * *